United States Patent [19]

Willmann et al.

[11] Patent Number: 5,036,418
[45] Date of Patent: Jul. 30, 1991

[54] MAGNETIC TAPE RECORDER WITH SHIELDING DEVICE FOR CONTACT-FREE SIGNAL TRANSFER BETWEEN COMPONENTS MOVED RELATIVE TO ONE ANOTHER

[75] Inventors: Hartmut Willmann, Gross-Zimmern; Ludwig Dittmann, Berlin; Richard Heinz, Mühltal; Jörn Lützeler, Zwingenberg, all of Fed. Rep. of Germany

[73] Assignee: BTS Broadcast Television Systems GmbH, Darmstadt, Fed. Rep. of Germany

[21] Appl. No.: 272,889
[22] PCT Filed: Feb. 19, 1988
[86] PCT No.: PCT/DE88/00086
  § 371 Date: Oct. 19, 1988
  § 102(e) Date: Oct. 19, 1988
[87] PCT Pub. No.: WO88/06783
  PCT Pub. Date: Sep. 7, 1988

[30] Foreign Application Priority Data

Feb. 25, 1987 [DE] Fed. Rep. of Germany ....... 3705928

[51] Int. Cl.⁵ .................................................. G11B 5/52
[52] U.S. Cl. ........................................ 360/108; 360/84
[58] Field of Search ................................. 360/108, 84

[56] References Cited

U.S. PATENT DOCUMENTS 3,414,683 12/1968 Dolby .
3,591,732 7/1971 Prochnow .
4,031,558 6/1977 Kusaka .......................... 360/108 X
4,096,535 6/1978 Highnote ............................ 360/84
4,364,098 12/1982 Hirota et al. .
4,517,615 3/1985 Hino .
4,654,738 3/1987 Kato ................................... 360/108

FOREIGN PATENT DOCUMENTS 3319878 1/1985 Fed. Rep. of Germany .
3603239 10/1986 Fed. Rep. of Germany .
1440279 6/1976 United Kingdom .

OTHER PUBLICATIONS

Watabe/Olympus, Magnetic Head Device for Vertical Magnetic Recording, Patent Abstracts of Japan, vol. 10, No. 60, p-435, Mar. 11, 1986.

Primary Examiner—A. J. Heinz
Attorney, Agent, or Firm—Frishauf, Holtz, Goodman & Woodward

[57] ABSTRACT

To improve the crosstalk behavior of a multi-channel magnetic tape recorder with a rotating head wheel, whose magnetic heads receive signals through a rotating transformer, the leads between the magnetic heads and the corresponding transformer windings are shielded from one another. Advantageously, this shielding is made of small tubes of an efficiently electroconductive metal which, in another embodiment, can be securely connected electrically and mechanically with the rotational axis. For further improvement of the crosstalk characteristics, the shielding can also be connected in an electrically conducting fashion with the short-circuit rings located between the individual transformers.

1 Claim, 1 Drawing Sheet

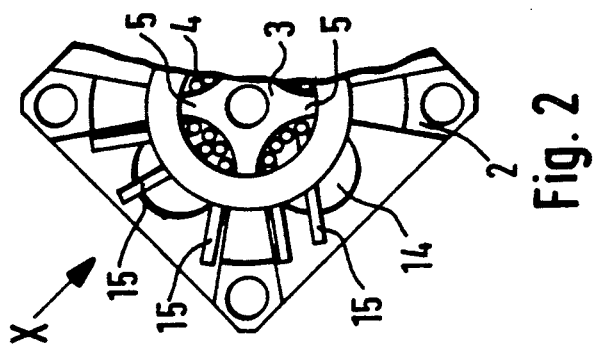
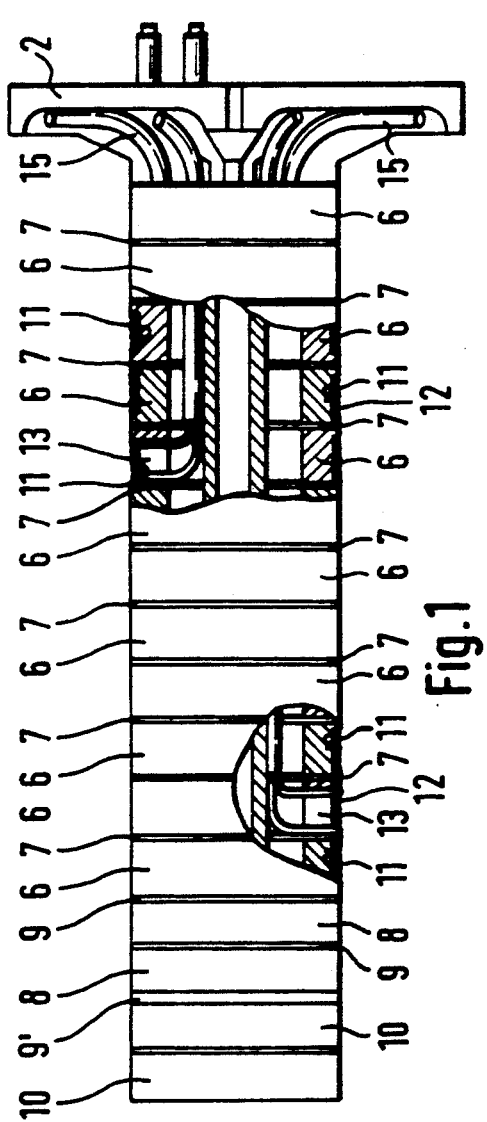
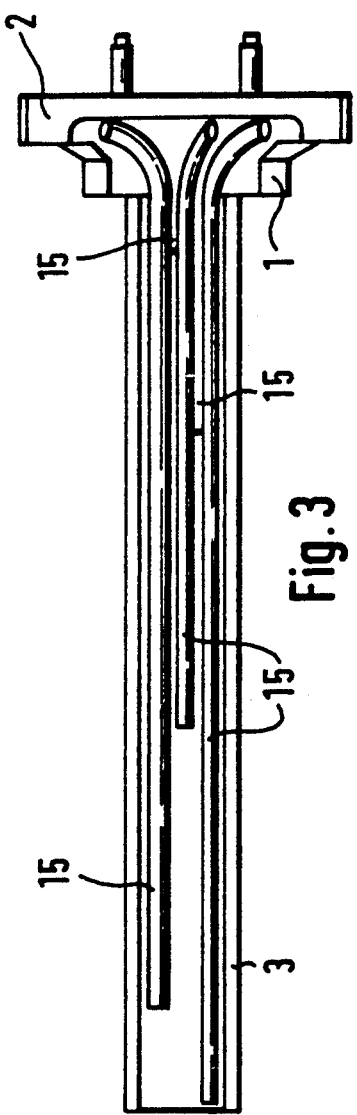

MAGNETIC TAPE RECORDER WITH SHIELDING DEVICE FOR CONTACT-FREE SIGNAL TRANSFER BETWEEN COMPONENTS MOVED RELATIVE TO ONE ANOTHER

CROSS REFERENCE

U.S. Pat. No. 3,414,683
U.S. Pat. No. 3,591,732
German Patent Disclosure Document 24 11 402
German Patent 26 57 813
U.S. Pat. No. 4,364,098
U.S. Pat. No. 4,517,615
German Patent Disclosure Document 30 35 676
German Patent Disclosure Document 36 03 239
German Patent 33 19 878.

BACKGROUND

The present invention relates generally to magnetic tape recorders, and more particularly to a recorder with improved cross-talk reduction.

For recording and/or reproducing broad-band signals, especially television signals, on/from magnetic tape, a high relative velocity can be obtained between the magnetic tape and the electromagnetic transformer or transformers, required for transfer, by disposing said transformers on a rapidly rotating head wheel or head drum, as is known from U.S. Pat. No. 3,414,683 and U S. Pat. No. 3,591,732. In recent devices, the magnetic tape wraps around the head drum or a fixed bipartite drum, in which the head wheel revolves concentrically, in a helical fashion, so that the slowly moving magnetic tape is scanned in tracks running diagonally with respect to the lengthwise direction of the magnetic tape, by the electromagnetic transformer(s) located at the circumference of the head wheel, hereinafter called magnetic heads for short, thereby recording the signals to be stored on the magnetic tape as areas of varying magnetization. During playback, the latter are converted back into electrical signals and processed further.

German Patent Disclosure Document 24 11 402 teaches the transfer of signal and/or drive and/or supply voltages and/or powers without contact, from the fixed part of the magnetic tape recorder to the rotating head drum and back again. For inductive transfer, transformers are used whose coils are arranged pairwise concentrically with respect to one another, and with the primary winding of each being arranged in an annular magnetic core on the fixed part and the secondary winding being mounted likewise in an annular magnetic core on the rotating part, i.e., the head drum or head wheel. Various designs of rotary transformers which act as transfer devices are sufficiently known (German Patent 26 57 813; U.S. Pat. No. 4,364,098; U.S. Pat. No. 4,517,615; German Patent Disclosure Document 30 35 676; German Patent Disclosure Document 36 03 239). One important problem in designing a transformer-type transfer device is its crosstalk behavior. At least one pair of transformer is required for each type of signal and voltage transfer. The transformer pairs are usually mounted close together to save space. An axially and radially staggered arrangement of the rotary transformer pairs to reduce crosstalk as in German Patent 33 19 878 is usually not possible because of insufficient space and a plurality of transformer pairs.

To reduce magnetic scatter, therefore, in the past the transformer pairs were usually shielded from one another by short-circuit rings made of nonmagnetic efficiently electroconductive materials. (German Patent Disclosure Document 30 35 676; U.S. Pat. No. 4,517,615.) The electrical noise fields which radiate from the leads between the magnetic heads and the corresponding transformer windings so far have been reduced only by twisting the lead pair.

THE INVENTION

Hence, the goal of the invention is to provide a magnetic tape recorder, a device for contact-free signal transfer between components moved relative to one another, in which the electromagnetic noise radiation that emerges is largely suppressed.

The magnetic tape recorder according to the invention has the advantage that the transformer leads are protected for their entire length running through the transformer part against crosstalk from other channels. Another advantage is that in the case of passive head wheel wiring, crosstalk protection is effective up to a point close to the rotating magnetic heads.

Advantageous embodiments and improvements of the magnetic tape recorder are possible as a result of the additional features. It is especially advantageous that the alignment of the leads with a plurality of transfer channels is definitely simplified. It is also advantageous that the pulling of the twisted leads into the lead paths provided for the purpose is considerably simplified.

It is also advantageous that the position of the leads does not change under the influence of centrifugal force.

Finally, it is advantageous that the interchangeability of the transformer leads is retained over their entire length.

BRIEF DESCRIPTION

One embodiment of the invention is shown in the drawing and described in greater detail in the following specification.

FIG. 1 shows the rotating part of the transformer, in a side view, partially cut away;

FIG. 2 shows the same part in a front view;

FIG. 3 shows a preassembled assembly corresponding to FIGS. 1 and 2, looking in direction X in FIG. 2.

DETAILED DESCRIPTION

The design of the device and the significance of the individual parts is described below with reference to FIGS. 1 and 3 of the drawing; only the rotating part of the transformer-transducer which is of primary interest is shown.

The basic body (1), made of a magnetic, efficiently electroconductive metal, preferably brass, consists of a mounting flange (2), which a receiving spindle (3) abuts axially. Receiving spindle (3) is provided over its entire length with a plurality of grooves (4) at its circumference. These grooves can be produced by drilling or milling. In the present case, grooves (4) were produced by drilling holes whose midpoints lie outside the finished receiving spindle (3). It is advantageous for manufacture in this respect if receiving spindle (3) initially has a larger diameter, so that bores (4) run through solid material. Then the receiving spindle is turned down to the desired diameter on a lathe, so that eventually a number of ribs (5) for centering the ferrite rings remain.

For contact-free transformer transfer of the signals from the moving part of the magnetic tape recorder, i.e., the head wheel, to the fixed part and vice versa, a plurality of rings made of a magnetizable material is mounted on receiving spindle (3). Because of the desired transformer characteristics at high frequencies, these rings are preferably made of ferritic material. Depending on the nature of the recording and/or playback circuit, one ferrite ring or a pair of ferrite rings is/are required for each record and playback channel. In the present case twelve transformer rings (6) are provided for twelve magnetic heads mounted at the circumference of the head wheel, said rings being separated from one another by thin intermediate rings made of a nonmagnetic efficiently electroconductive material (7) to suppress crosstalk. The ferrite rings for coupling the transformer paths are abutted by two additional ferrite rings (8) to transfer the erase voltage for additional rotating erase heads mounted on the head wheel. It has been found that these ferrite rings (8) can be slightly narrower than the ferrite rings (6) for coupling the signals, but otherwise they are similarly designed and likewise separated by a short-circuit ring (9) from one another and from the last translator ring (6) by an additional short-circuit ring (9). Two additional transformer rings (10) are provided to supply voltage to the active switching circuits located on the head wheel, said rings (10) being shielded by a wide short-circuit ring (9) from the other transformer rings because of the considerably different potential. Each transformer ring has a groove (11) on its outer circumference to receive transformer winding (12). In addition, each transformer ring (6, 8, 10), at one point on the circumference, has a radial groove or bore (13) through which the connecting leads pass. Mounting flange (2) contains a plurality of radial recesses (14) for the guidance and connection of the transformer leads of the magnetic heads mounted on the head wheel. In each of the grooves (4) forming a quarter of a circle, a plurality of lead pairs is provided, each of which is guided in a thin small tube (15) made of a nonmagnetic efficiently electroconductive material to protect it against damage, short circuits, and electrical and/or electromagnetic crosstalk. The length of tubes (15) is adjusted so that the transformer leads are protected until they come as close as possible to the transformer windings.

For reasons of mechanical stability and to avoid imbalances, tubes (15) are soldered over their entire length to receiving spindle (5). The tube diameter and tube wall thickness can be optimized from the design standpoint and in accordance with the desired damping of crosstalk. The wall thickness can be established roughly depending on the anticipated noise frequencies and the depth of penetration of the electromagnetic fields, as follows:

$$d = \sqrt{\frac{\rho}{\pi \mu \mu_o \omega}}$$

where
$\rho$ = specific resistance
$\mu$ = relative permeability
$\mu_o$ = absolute permeability
$W$ = angular frequency of signals to be transmitted Basically, a similar design is possible for the fixed part of the transformer. The tube guides, being located on the outside diameter, are much more easily accessible.

The transformer according to the invention is characterized by problem-free manufacture and good shielding action by contrast with the arrangements in the prior art.

For further improvement in crosstalk behavior, shielding (15) on the transformer leads can be connected in an electrically conducting fashion with short-circuit rings (7, 9, 9') between transformer rings (6, 8, 10).

We claim:
1. Magnetic tape recorder with a device for contact-free transfer of signals between components moving in relation to each other, comprising
   a receiving spindle (3) of magnetic, electroconductive material;
   a plurality of transformer ring pairs (6, 8, 10) of a magnetizable material, mounted on said receiving spindle (3), each transformer ring having a transformer winding (12) with leads;
   a plurality of short-circuit rings (7, 9, 11) mounted on said receiving spindle (3); wherein
   said leads are electromagnetically shielded from each other, in the vicinity of each transformer ring pair, by respective surrounding shielding tubes (15) of a non-magnetic but efficiently electroconductive material, and wherein
   said shielding tubes (15) of the transformer leads are each permanently connected electrically and mechanically with the receiving spindle (3) and are connected in an electrically conductive manner with the short-circuit rings (7, 9, 11).

* * * * *